A. BEASLEY.
CAR TRUCK.
APPLICATION FILED NOV. 15, 1911.

1,029,582.

Patented June 18, 1912.
2 SHEETS—SHEET 1.

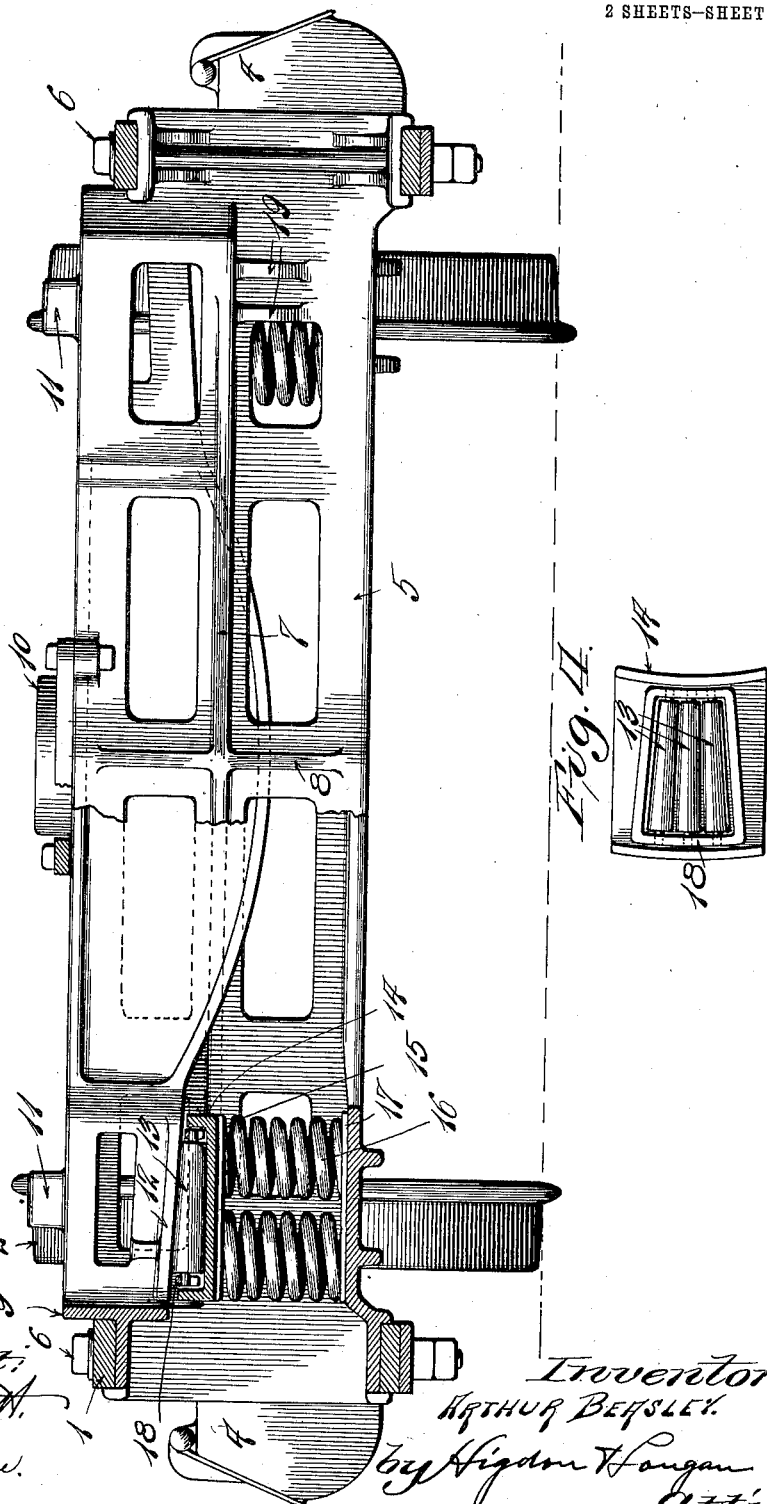

UNITED STATES PATENT OFFICE.

ARTHUR BEASLEY, OF EAST ST. LOUIS, ILLINOIS.

CAR-TRUCK.

1,029,582. Specification of Letters Patent. Patented June 18, 1912.

Application filed November 15, 1911. Serial No. 660,539.

*To all whom it may concern:*

Be it known that I, ARTHUR BEASLEY, a citizen of the United States, and resident of East St. Louis, Illinois, have invented certain new and useful Improvements in Car-Trucks, of which the following is a specification containing a full, clear, and exact description, reference being had to the accompanying drawings, forming a part hereof.

My invention relates to car trucks and consists in the novel construction herein described and claimed.

The object of my invention is to provide an improved car truck in which the truck bolster will have a horizontal pivotal or rotary movement with respect to the side-frames, whereby the side frames and wheel flanges will be relieved from strains while the truck is passing over curves in the track; by means of which construction sharp flanges and consequent de-railment of the truck will often be prevented.

Figure 1:
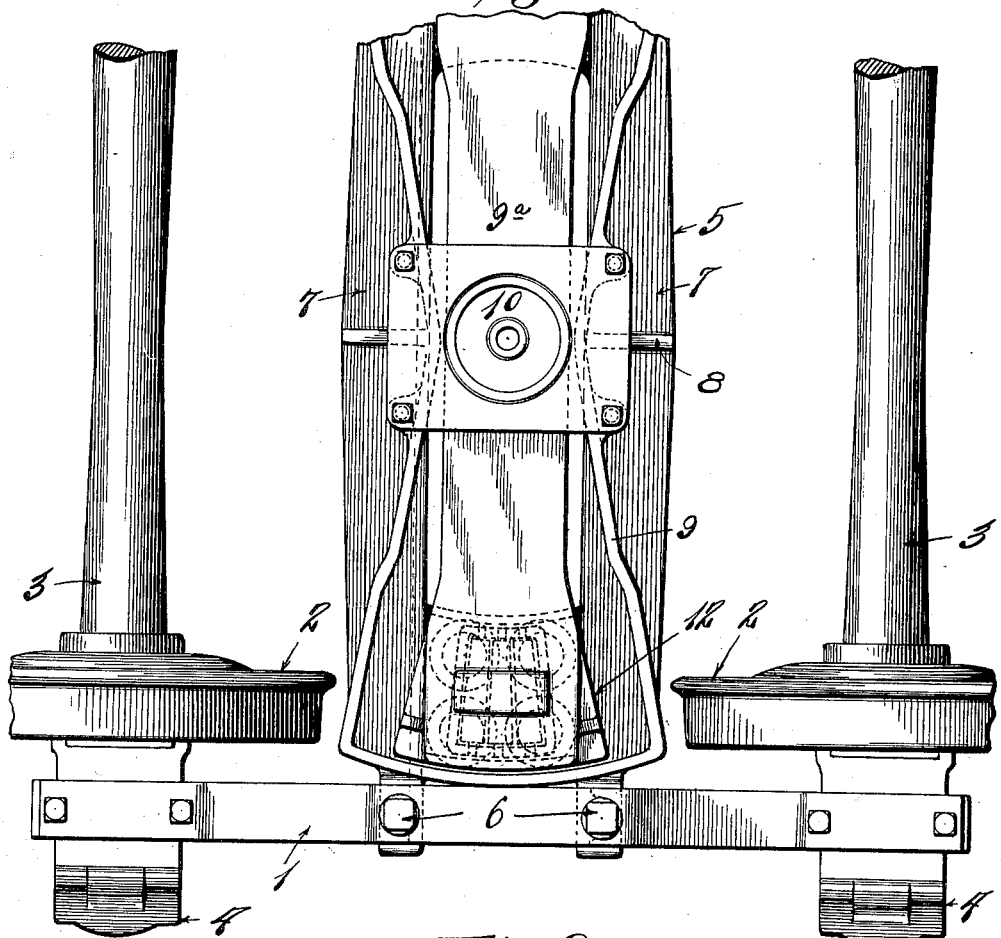
Figure 2:
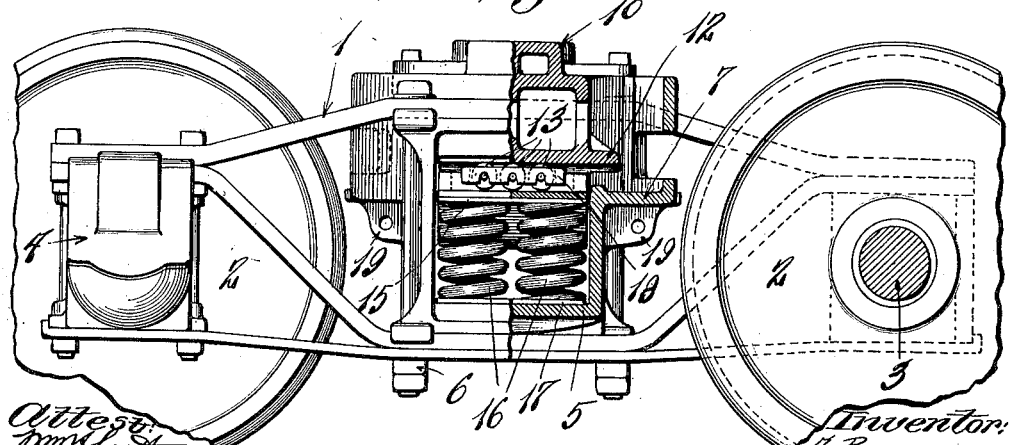

In the drawings: Figure 1 is a sectional plan view of a car truck embodying my invention, one side frame and adjacent parts being broken away; Fig. 2 is a sectional side elevation of my improved car truck; Fig. 3 is a sectional end elevation of my improved car truck; and Fig. 4 is a detailed view of one of the tracks for the anti-friction devices.

In carrying out my invention, I make use of the common arch-bar side frames 1, or any of the usual forms of cast steel side frames may be substituted for the said arch-bar side-frames.

2 indicates the usual truck wheels; 3 the axles; and 4 the journal boxes.

I preferably connect the two side-frames 1 of the truck by means of a cast steel box transom 5, the ends of which are connected to the side-frames by means of column bolts 6. The projecting outer ends of the said box transom resting upon the lower arch-bars. The exterior of the said box-transom 5 is provided with horizontal stiffening ribs 7 and vertical strengthening ribs 8. Upon the upper side of said box transom 5 is formed an integral bolster seat 9 in which the truck bolster 9ª is pivotally mounted upon anti-friction devices also contained within the said bolster seat.

The numeral 10 indicates the center bearing and 11 the side bearings of the bolster 9ª, which in the present case is of the cast steel box form and has on its under surface near its outer ends a track 12 for the anti-friction devices. The anti-friction tracks 12 of the bolster are preferably cast integral with the bolster by laterally enlarging the base of the bolster near its outer ends and thereby making the tracks fan-shaped in plan view, as shown more clearly in Fig. 1. The bolster seat is also fan shaped or flaring laterally, beginning at the center of its length and extending outwardly to a point beyond the free ends of the bolster. The bolster seat is thus made considerably larger laterally than the dimensions of the bolster so as to permit the relative rotary movement of the bolster and its seat.

The bolster anti-friction tracks 12 rest upon a series of tapered anti-friction rollers 13, which in turn travel upon an anti-friction roller track 14, which is mounted in the outer ends of said box-transom 5 directly above the spring caps 15, so that the vertical walls of the box-transom act as guides for the said roller track. The usual coil springs 16 are interposed between the spring caps 15 and the spring seats 17, said spring seats rest upon the bottom wall of the box-transom, which is directly beneath said spring seats. The anti-friction rollers 13 are spaced apart by the usual roller cage 18. The said roller track 14 may, itself, be used as a spring cap, as the said roller track moves up and down with the upper ends of the said springs.

19 indicates the usual brake-hanger ears. Said roller track 14 is preferably in the form of a pan or plate, which is detachably mounted between the vertical walls of the box-transom and may be renewed whenever necessary, as may also the rollers 13.

The Master Car Builders' standard journal box is preferably employed, as are all other well known Master Car Builders' standard parts made use of in constructing my improved truck.

When my improved truck passes over a curve at high speed, the side frames and the box transom rotate relative to the bolster 9ª, and the side frames and wheel flanges will thereby be relieved from strains, which would otherwise be thrown upon them. Rotary movement of the bolster 9ª is limited within reasonable bounds by the vertical walls of the bolster seat 9.

What I claim is:

1. In a car truck, two separate side frames in combination with a transom, a truck-bolster seat fan-shaped at its ends and mounted within said transom, a truck bolster rotatively mounted within said seat, and anti-friction devices supporting said bolster within said seat.

2. In a car truck, two separate side frames in combination with a transom, a truck-bolster seat fan-shaped at its ends and mounted within said transom, a truck bolster mounted to rotate in said seat, anti-friction devices supporting the ends of said bolster, and springs supporting said anti-friction devices.

In testimony whereof, I have signed my name to this specification, in presence of two subscribing witnesses.

ARTHUR BEASLEY.

Witnesses:
E. L. WALLACE,
JOHN C. HIGDON.

Copies of this patent may be obtained for five cents each, by addressing the "Commissioner of Patents, Washington, D. C."